(12) United States Patent
Panagos et al.

(10) Patent No.: US 12,206,751 B2
(45) Date of Patent: Jan. 21, 2025

(54) METHODS AND SYSTEMS FOR CONTENT DISTRIBUTION

(71) Applicant: COMCAST CABLE COMMUNICATIONS, LLC, Philadelphia, PA (US)

(72) Inventors: James Panagos, Denver, CO (US); Jeffrey Elsloo, Centennial, CO (US); John Benton, Evergreen, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 777 days.

(21) Appl. No.: 16/818,772

(22) Filed: Mar. 13, 2020

(65) Prior Publication Data
US 2021/0288864 A1  Sep. 16, 2021

(51) Int. Cl.
*H04L 69/16*    (2022.01)
*H04L 65/65*    (2022.01)
*H04N 21/643*   (2011.01)
*H04N 21/858*   (2011.01)

(52) U.S. Cl.
CPC .............. *H04L 69/16* (2013.01); *H04L 65/65* (2022.05); *H04N 21/643* (2013.01); *H04N 21/8586* (2013.01)

(58) Field of Classification Search
CPC ............ H04L 29/06095; H04L 65/608; H04N 21/643; H04N 21/8586
USPC ........................................................ 709/231
See application file for complete search history.

(56) References Cited

U.S. PATENT DOCUMENTS

2012/0239725 A1* 9/2012 Hartrick ................ H04L 69/163
                                                           709/203
2017/0195448 A1* 7/2017 Su .......................... H04N 21/433

FOREIGN PATENT DOCUMENTS

EP        2 501 103 A1     9/2012
WO    WO-2019069120 A1 *   4/2019 .......... G06F 9/45558

OTHER PUBLICATIONS

Search Report issued in European Patent Application No. 21 16 2539, dated Jul. 26, 2021, 2 pages.

* cited by examiner

Primary Examiner — Suraj M Joshi
Assistant Examiner — Sherman Lin
(74) Attorney, Agent, or Firm — Ballard Spahr LLP

(57) ABSTRACT

Methods and systems are described for content distribution. A first computing device may send a request for content to a second computing device. The first computing device may receive data that indicates a third computing device, and the first computing device may send a request for content to the third computing device. The third computing device may facilitate the first computing device receiving content from a fourth device.

20 Claims, 10 Drawing Sheets

METHODS AND SYSTEMS FOR CONTENT DISTRIBUTION

BACKGROUND

Content distribution networks may utilize various methods for distributing content to user devices, such as Hypertext Transfer Protocol (HTTP) or Domain Name System (DNS) protocol. When utilizing HTTP a user device may send an HTTP request to a computing device in order to connect to a host, and the computing device may utilize a Uniform Resource Locator (URL) to redirect the request to a device associated with the URL. However, the DNS protocol does not provide the computing device with the same amount of information as is found in the URL, and this limitation may lead to a decrease in efficiency because the computing device cannot determine the correct device to which the client device should connect.

SUMMARY

It is to be understood that both the following general description and the following detailed description are exemplary and explanatory only and are not restrictive. Methods and systems for content distribution are described. A user device may send a request (e.g., a request for content) to a DNS device, and the user device may receive data (e.g., an address) from the DNS device that indicates a tunnel device that the user device may communicate with to fulfill the request. The user device may establish a communication connection and/or communication session with the tunnel device, and the user device may send a request for content to the tunnel device. The tunnel device may facilitate the user device receiving content from a cache device that stores the requested content. For example, the tunnel device may encapsulate the request sent by the user device and may send the encapsulated request to the cache device, which may cause the cache device to send the requested content to the user device.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
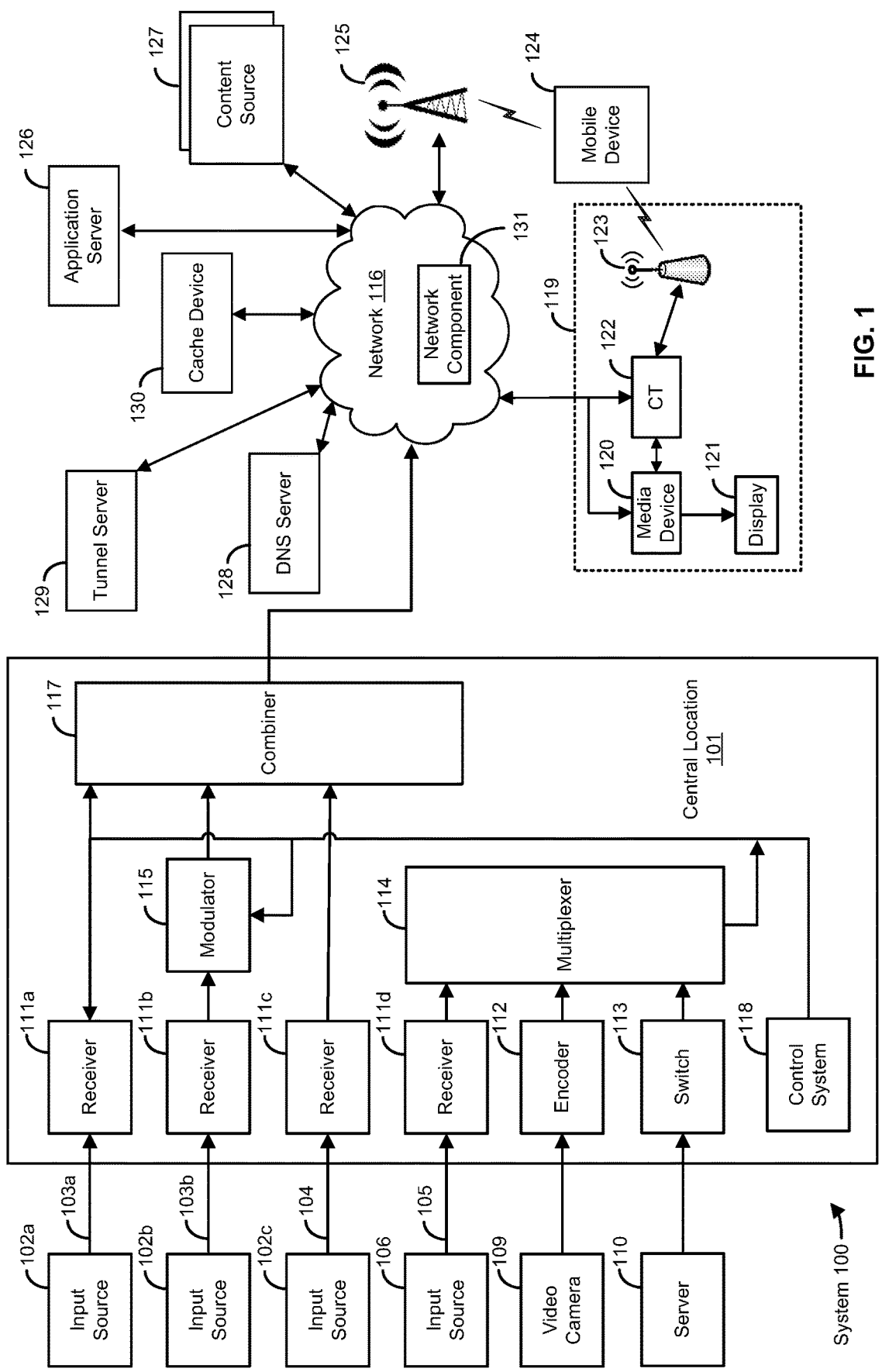
FIG. 1 shows an example system for content distribution.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

This detailed description may refer to a given entity performing some action. It should be understood that this language may in some cases mean that a system (e.g., a computer) owned and/or controlled by the given entity is actually performing the action.

Described herein are systems and methods for content distribution. A user device may establish an initial communication connection (e.g., a Transmission Control Protocol (TCP) connection) with a computing device (e.g., a tunnel server). For example, the user device may request content from the computing device. The computing device may determine one or more cache devices that may be able to provide the requested content to the user device, and the computing device may determine a cache device to provide the content to the user device. In order to connect the user device with the determined cache device, the computing device may reset the communication connection (e.g., by send a TCP reset request) with the user device. The user device may re-establish a communication connection with the computing device, and the computing device may be configured to forward subsequent requests from the user device to the cache device. For example, after the reset, the request from the user device may be forwarded by the computing device to the determined cache device, and the determined cache device may be configured to provide the requested content to the user device.

The computing device may be configured to encapsulate the request from the user device (e.g., the entire original IP packet from the user device) within a data packet. By encapsulating the request in a data packet, the user device's packets may be sent, via the computing device, to the cache device as if the packets were sent directly to the cache device by the user device. Stated differently, the cache device is unaware that the request sent by the user device traveled via the computing device because the encapsulation hides the interaction between the user device and the computing device. When the cache device receives the encapsulated data packet, the cache device may decapsulate the data packet to determine the request. The request may indicate that the request originated from the user device. The cache device may then process the request as normal (e.g., including a new TCP 3-way handshake, any Transport Layer Security (TLS) negotiation, etc.), and may send a response back to the user device. The response need not travel to the user device via the computing device. Stated differently, the cache device may send the requested content to the user device without traversing via the computing device (e.g., the cache device sends the content directly to the user device). Thus, the computing device can be removed from a high demand flow because the computing device does not need to send the content to the user device. Rather, the cache device sends the requested content directly to the user device.

FIG. 1 shows an example system 100 for content distribution. Those skilled in the art will appreciate that the methods described herein may be used in systems that employ both digital and analog equipment. One skilled in the art will appreciate that provided herein is a functional description and that the respective functions may be performed by software, hardware, or a combination of software and hardware.

The system 100 may have a central location 101 (e.g., a headend), which may receive content (e.g., data, input programming, and the like) from multiple sources. The central location 101 may combine the content from the various sources and may distribute the content to user (e.g., subscriber) locations (e.g., location 119) via a network 116 (e.g., content distribution and/or access system).

The central location 101 may receive content from a variety of sources 102a, 102b, and 102c. The content may be sent from the source to the central location 101 via a variety of transmission paths, including wireless (e.g., satellite paths 103a, 103b) and a terrestrial path 104. The central location 101 may also receive content from a direct feed source 106 via a direct line 105. Other input sources may be capture devices such as a video camera 109 or a server 110. The signals provided by the content sources may include a single content item, a portion of a content item (e.g., content fragment, content portion, content section), a content stream, a plurality of content streams, a multiplex that includes several content items, and/or the like. The plurality of content streams may comprise different bitrates, framerates, resolutions, codecs, languages, and so forth. The signals provided by the content sources may be video frames and audio frames that comprise metadata.

The central location 101 may be one or a plurality of receivers 111a, 111b, 111c, 111d that are each associated with an input source. MPEG encoders such as encoder 112, are included for encoding local content or a video camera 109 feed. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer (mux) 114.

Data may be inserted into the content at the central location 101 by a device (e.g., the encoder 112, the multiplexer 114, the modulator 115, and/or the combiner 117). The data may be metadata. The device may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with an encoder and/or transcoder, such as a MPEG encoder and/or transcoder. The metadata may also be inserted at other stages in a content distribution network such as at a packager, at a cache device associated with the content distribution network, at an input to the client device, or by any device at any point along the content distribution.

The central location 101 may be one or more modulators 115 for interfacing to a network 116. The modulators 115 may convert the received content into a modulated output signal suitable for transmission over the network 116. The output signals from the modulators 115 may be combined, using equipment such as a combiner 117, for input into the network 116.

The network 116 may be a content delivery network, a content access network, and/or the like. The network 116 may be configured to provide content from a variety of sources using a variety of network paths, protocols, devices, and/or the like. The content delivery network and/or content access network may be managed (e.g., deployed, serviced) by a content provider, a service provider, and/or the like. The network 116 may facilitate delivery of audio content and video content. The audio content and video content may be made up of one or more packets. The audio content may be sent in one or more streams of content. The one or more streams of audio content may comprise different bitrates, framerates, resolutions, codecs, languages, and so forth. The video content may be sent in one or more streams of content. The one or more streams of video content may comprise different bitrates, framerates, resolutions, codecs, languages, and so forth. The audio content may be audio frames, and the video content may be video frames.

A control system 118 may permit a system operator to control and monitor the functions and performance of system 100. The control system 118 may interface, monitor, and/or control a variety of functions, including, but not limited to, the channel lineup for the television system, billing for each user, conditional access for content distributed to users, and the like. The control system 118 may provide input to the modulators 115 for setting operating parameters, such as system specific MPEG table packet organization or conditional access information. The control system 118 may be located at the central location 101 or at a remote location.

The network 116 may distribute signals from the central location 101 to user locations, such as a user location 119. The signals may be one or more streams of content. The streams of content may be audio content and/or video content. The audio content may comprise a stream separate from the video content. The network 116 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

A multitude of users may be connected to the network 116 at one or more user locations. At the user location 119, a media device 120 may demodulate and/or decode (e.g., determine one or more audio frames and video frames), if needed, the signals for display on a display device 121, such as on a television set (TV) or a computer monitor. The media device 120 may be a demodulator, decoder, frequency tuner, and/or the like. The media device 120 may be directly connected to the network (e.g., for communication via in-band and/or out-of-band signals of a content delivery network) and/or connected to the network 116 via a communication terminal 122 (e.g., for communication via a packet switched network). The media device 120 may be a set-top box, a digital streaming device, a gaming device, a media storage device, a digital recording device, a combination thereof, and/or the like. The media device 120 may comprise one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, a satellite dish, and so forth. The media device 120 may be configured to communicate with one or more devices associated with the system 100. For example, the media device 120 may send a communication (e.g., a request, a query, etc.) that indicates an address that the media device 120 desires to access. As another example, the media device 120 may send a request for content to one or more devices associated with the system 100.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured to communicate with the network 116 via a variety of protocols, such as internet protocol, transmission control protocol, file transfer protocol, session initiation protocol, voice over internet protocol, and/or the like. For a cable network, the communication terminal 122 may be configured to provide network access via a variety of communication protocols and standards, such as Data Over Cable Service Interface Specification (DOCSIS).

The user location 119 may comprise a first access point 123, such as a wireless access point. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 may not be fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

The system 100 may comprise an application server 126. The application server 126 may provide services related to applications. The application server 126 may comprise an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to provide data, handle requests, and/or otherwise facilitate operation of applications for the user.

The system 100 may comprise one or more content sources 127. The content source 127 may be configured to provide content (e.g., video, audio, games, applications, data) to one or more devices (e.g., the cache device 130). The content source 127 may provide the content as one or more packets of the content. The content source 127 may be configured to provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to provide the content via a packet switched network path, such as via an internet protocol (IP) based connection.

The content source 127 may provide audio content and video content. The content source 127 may provide one or more audio frames of audio content and one or more video frames of video content. The content source 127 may encode the audio frames and the video frames. Data may be inserted into the content at the content source 127. The data may be metadata. The content source 127 may encode data into the content. The metadata may be inserted by the device in a Moving Picture Experts Group (MPEG) bitstream, MPEG Supplemental Enhancement Information (SEI) messages, MPEG-2 Transport Stream (TS) packet, MPEG-2 Packetized Elementary Stream (PES) header data, ISO Base Media File Format (BMFF) data, ISO BMFF box, or any in any data packet. The metadata may be inserted at the input or output associated with content source 127. The metadata may also be inserted at other stages in a content distribution network such as at a packager, at a cache device (e.g., the cache device 130) associated with the content distribution network, at an input to the client device, or by any device at any point along the content distribution. While the content source 127 has been described as providing the audio content and video content, as well as encoding the metadata, for case of explanation, a person of ordinary skill in the art would appreciate that any device in the system 100 may provide the content to a cache device 130, described further below.

The network 116 may comprise a network component 131. The network component 131 may be any device, module, and/or the like communicatively coupled to the network 116. The network component 131 may also be a router, a switch, a splitter, a packager, a gateway, an encoder, a storage device, a multiplexer, a network access location (e.g., tap), physical link, and/or the like. Any of the application server 126, the content source 127, a Domain Name System (DNS) server 128, a tunnel server 129, a cache device 130, and/or the media device 120 may serve as a server relative to a user device, such as the media device 120 and/or the mobile device 124.

The DNS server 128 may be configured to receive a request from a user device (e.g., the media device 120, the mobile device 124, etc.). For example, the DNS server 128 may receive a request (e.g., a query) for an Internet Protocol (IP) address based on a domain name provided in the request. As an example, the user device may desire to access content, and the user device may provide a domain name to the DNS server 128 that is associated with the content. The DNS server 128 may utilize the provided domain name to identify an IP address associated with the provided domain name. The DNS server 128 may provide the identified IP address to the user device to facilitate the user device accessing content. For example, the DNS server 128 may send an IP address to the user device that is associated with a computing device associated with a content provider (e.g., the content source 127) that the user device may communicate with to receive content. As an example, the IP address may be associated with a content sever and/or a cache device. As another example, the IP address may be associated with a tunnel server 129, described further below, that can facilitate communication with a cache device. The user device may utilize the IP address provided by the DNS server 128 to establish a communication connection (e.g., a communication session, a communication link, etc.) with the tunnel server 129. The user device may utilize the IP address to send a request for content to the tunnel server 129 to facilitate receiving the requested content.

The system 100 may comprise a tunnel server 129. The tunnel server 129 may be configured to determine the content stored on one or more cache devices 130. For example, the tunnel server 129 may utilize consistent hashing to determine the content that is stored on the one or more cache devices 130. The tunnel server 129 may utilize a database that indicates the content stored on each cache device 130 of the one or more cache devices. Further, the tunnel server 129 may be configured to determine an operational status of one or more cache devices 130. For example, the one or more cache devices 130 may send data (e.g., a packet, heartbeat signal, etc.) to the tunnel server 129 to inform the tunnel server 129 of the operational status of the cache device 130, as well as the content stored on the cache device 130. The tunnel server 129 may store the data received from the cache device 130 in a database. The tunnel server 129 may utilize the database to monitor the status of the one or more cache devices 130.

The tunnel server 129 may be configured to facilitate content delivery from the cache device 130 to the user device. For example, the user device may send a request for content to the tunnel server 129. The tunnel server 129 may utilize consistent hashing and/or the database to determine one or more cache devices 130 that may comprise the requested content. For example, the user device may request a specific quality level of the content, and the tunnel server 129 may utilize the database to identify the cache devices 130 that have (e.g., that store) the content in the requested quality level. Further, the tunnel server 129 may utilize consistent hashing and/or the database to determine a cache device that has preferred operational characteristics. As an example, there may be three cache devices 130 that have the requested content. The operational characteristics of each of the cache devices 130 may indicate the utilization of each of the cache devices 130. The tunnel server 129 can utilize the operational characteristics to identify one of the three cache devices 130 that may be best to provide the content to the user device. For example, the tunnel server 129 may select a cache device 130 that is less utilized (e.g., has higher bandwidth to process the content request), that is located closer in proximity to the user device, and so forth, to provide a better experience for the user device as compared to the other two cache devices 130.

The tunnel server 129 may be configured to communicate with a user device (e.g., the media device 120, the mobile device 124, etc.). The tunnel server 129 may establish a communication connection with the user device. For example, the tunnel server 129 may establish a TCP connection with the user device. The tunnel server 129 may receive a request for content. The request for content may be received by the tunnel server 129 via the TCP connection with the user device. The tunnel server 129 may determine a cache device 130 that may have access to the requested content. For example, the tunnel server 129 may use consistent hashing and/or a database to determine the cache device 130.

The tunnel server 129 may request that the user device re-establish a communication connection with the tunnel server 129. For example, the tunnel server 129 may send a TCP reset communication (e.g., request) to the user device. The user device may reset the communication connection with the tunnel server 129 based on the TCP reset communication. The tunnel server 129 may reset the communication connection with the user device. After the communication connection is reset, the tunnel server 129 may receive a second request for content from the user device. For example, the user device may send resend the original request for content to the tunnel server 129. The request for content may be an IP packet.

The tunnel server 129 may encapsulate the second request for content within a second IP packet. The second request for content may indicate that request for content came from the user device. The second request for content may indicate that the user device is the device that is requesting to receive the content. The second request for content may be encapsulated within the second IP packet. The tunnel server 129 may send the second IP packet (e.g., the encapsulated packet) to the cache device 130. By sending the second IP packet (e.g., the encapsulated packet) to the cache device 130, the tunnel server 129 may facilitate the user device receiving content from the cache device 130.

The system 100 may comprise one or more cache devices 130. The cache device 130 may be configured to provide content, services, and/or the like to the user location 119. The cache device 130 may be one of a plurality of cache devices distributed across the network 116. For example, the cache device 130 may be an edge device. The cache device 130 may be located in a region proximate to the user location 119. A request for content from the user may be directed to the cache device 130 (e.g., due to the location of the cache device 130 and/or network conditions). The cache device 130 may be configured to package content for delivery to the user (e.g., in a specific format requested by a user device), provide the user a manifest file (e.g., or other index file describing portions of the content), provide streaming content (e.g., unicast, multicast), provide a file transfer, and/or the like. The cache device 130 may cache or otherwise store content (e.g., frequently requested content) to enable faster delivery of content to users.

The cache device 130 may receive the second IP packet from the tunnel server 129. The cache device 130 may decapsulate the second IP packet. For example, the cache device 130 may process the second IP packet to determine the request that was encapsulated within the second IP packet. The cache device 130 may process the request that was encapsulated within the second IP packet. For example, the cache device 130 may determine what the requested content is, and send the requested content to the device requesting the content. For example, the cache device 130 may send the requested content to the user device.

The cache device 130 may determine that the request did not originate from the tunnel server 129. For example, the cache device 130 may receive the second IP packet (e.g., the packet that comprises the encapsulated request) from the tunnel server 129, and the cache device 130 may determine that the second IP packet was sent by the tunnel server 129. However, when the cache device 130 processes the second IP packet to determine the payload (e.g., the request for content) of the second IP packet, the cache device 130 may determine that the request for content came from the user device and not the tunnel server 129. Thus, the cache device 130 sends the requested content to the user device, and not the tunnel device 129, because the request originated from the user device even though the cache device 130 received the packet that contained the request from the tunnel device 129. Therefore, the tunnel server 129 can facilitate transmitting content to the user device from the cache device 130 without the tunnel server 129 transmitting the content to user device. Accordingly, the cache device 130 transmits the content to the user device (e.g., directly) without going through the tunnel server 129. Thus, the processing load on the tunnel server 129 is reduced because the tunnel server 129 does not have to send the content to the user device, while at the same time facilitating the user device receiving the content from the cache device 130.

The media device 120 may send a communication (e.g., a request, a query, etc.) that indicates an address that the media device 120 desires to access. For example, the media device 120 may send a request for content that indicates a domain name to the DNS server 128. The domain name may be associated with the content. As an example, the domain name may indicate an address where the media device 120 may be able to access the content. The DNS server 128 may receive the request, and may determine an IP address based on the request. For example, the DNS server 128 may determine an IP address associated with the cache device 130 based on the request received from the media device 120. As another example, the DNS server 128 may determine an IP address associated with the tunnel server 129 based on the request received from the media device 120. The DNS sever 128 may send the IP address associated with the tunnel server 129 to the media device 120. The media device 120 may receive the IP address from the DNS server 128.

The media device 120 may attempt to establish a communication connection with the tunnel server 129. For example, the media device 120 may establish a TCP connection with the tunnel server 129. The media device 120 may send a request for content to the tunnel server 129. The request for content may be received by the tunnel server 129 via the TCP connection with the media device 120. The tunnel server 129 may determine a cache device 130 that may have access to the requested content. For example, the cache device 130 may be a cache device (e.g., a cache server, an edge cache, etc.). The tunnel server 129 may send a communication reset request to the media device 120. For example, the tunnel server 129 may send the communication reset request based on the tunnel server 129 determining a device (e.g., the cache device 130) that can provide the requested content to the media device 120. As another example, the tunnel server 129 may end the communication connection with the media device 120. As an additional example, the tunnel server 129 may send the communication reset request to the media device 120 to force the media device 120 to re-establish the communication connection with the tunnel server 129.

The media device 120 may send a second communication request to the tunnel server 129. The second communication request may be the same as the original communication request. The tunnel server 129 may utilize the second communication request to facilitate the media device 120 receiving content from the cache device 130. For example, the tunnel server 129 may forward the communication (e.g., the request) received from the media device 120 to cache device 130. As an example, the tunnel server 129 may encapsulate the request for content within an IP packet and may send the encapsulated request to the cache device 130.

The cache device 130 may receive the IP packet from the tunnel server 129. The cache device 130 may process (e.g., decapsulate) the IP packet to determine the request that was encapsulated within the IP packet. For example, the cache device 130 may process the IP packet to determine the request that was sent by the media device 120. The cache device 130 may determine the requested content and may send the requested content to the media device 120. For example, the cache device 130 may send the requested content directly to the media device 120 without sending the requested content via the tunnel server 129. Thus, while the cache device 130 receives the request in an encapsulated packet from the tunnel server 129, the cache device 130 sends the requested content to the media device 120 because, once the request is decapsulated, the cache device 130 determines the request originated from the media device 120 and not the tunnel server 129. Accordingly, the tunnel server 129 facilitates the media device 120 receiving content from the cache device 130 without the tunnel server 129 sending the requested content to the media device 120. Therefore, the bandwidth of the tunnel server 129 is increased to handle additional requests because the tunnel server 129 does not send the content to the media device 120, which may be resource intensive for the tunnel server 129. Accordingly, the tunnel server 129 may simply handle requests and facilitate the cache device 130 providing the requested content to the media device 120, which may be less resource intensive. While the operation of the system 100 was described with reference to the media device 120 for case of explanation, a person skilled in the art would appreciate that the operation of the system 100 is equally applicable to the mobile communication terminal 122 and/or the mobile device 124.

Figure 2:
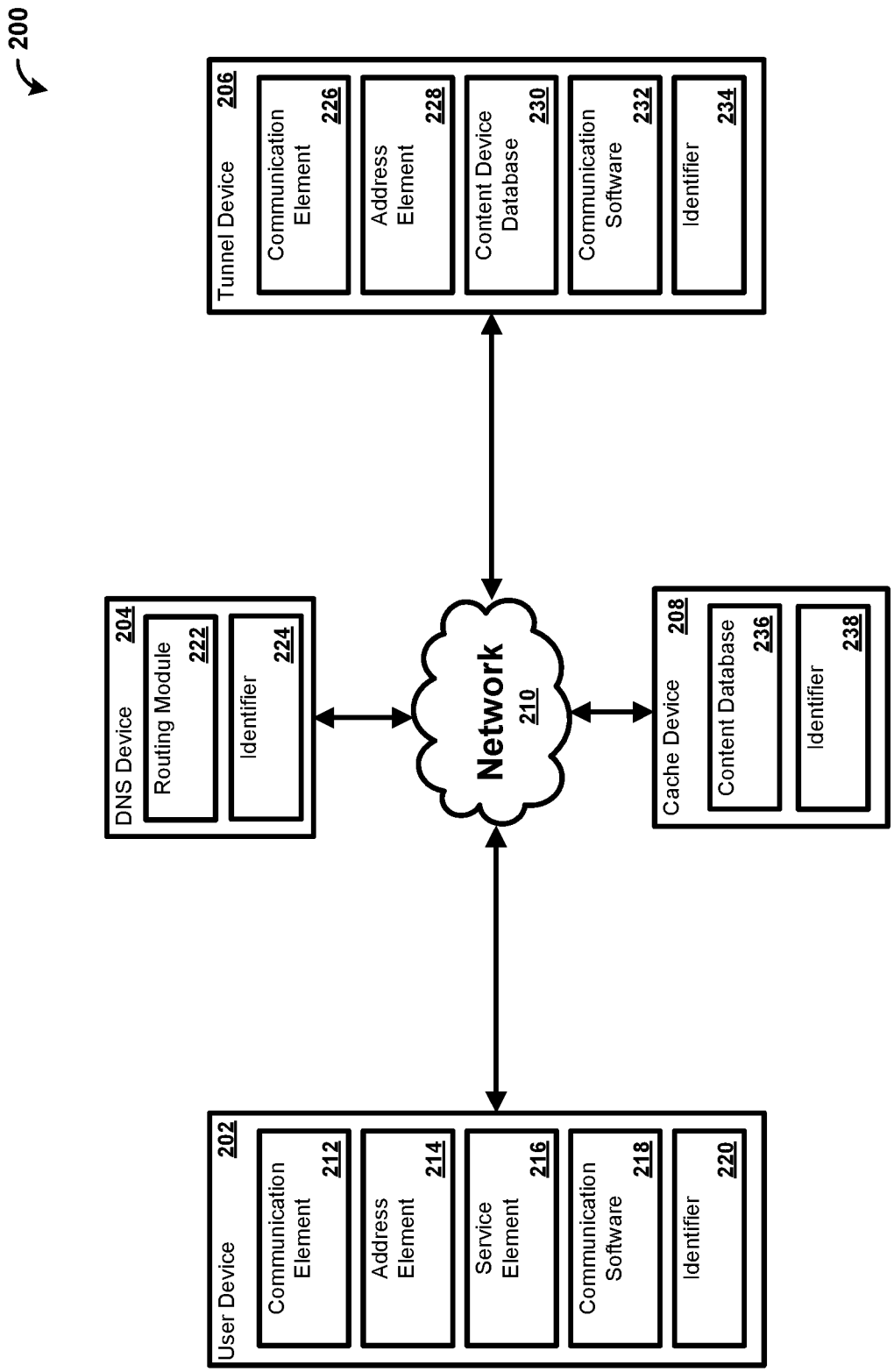
FIG. 2 shows an example system for content distribution.

FIG. 2 shows an example system 200 for content distribution. The system 200 may comprise a user device 202, a DNS device 204, a tunnel device 206, and a cache device 208. The user device 202 may communicate with the DNS device 204, the tunnel device 206, and/or the cache device 208 via a network 210 (e.g., the network 116 of FIG. 1). The network 210 may support communication between the user device 202 and the DNS device 204, the tunnel device 206, and/or the cache device 208 via a short-range communications (e.g., BLUETOOTH®, near-field communication, infrared, Wi-Fi, etc.) and/or via a long-range communications (e.g., Internet, cellular, satellite, and the like). For example, the network 210 may utilize Internet Protocol Version 4 (IPv4) and/or Internet Protocol Version 6 (IPv6).

The user device 202 (e.g., the media device 120, the communication terminal 122, and/or the mobile device 124, etc.) may comprise a communication element 212, an address element 214, a service element 216, communication software 218, and an identifier 220.

The communication element 212 may be configured to communicate via any network protocol. For example, the communication element 212 may communicate via a wired network protocol (e.g., Ethernet, LAN, etc.) on a wired network (e.g., the network 210). The communication element 212 may comprise a wireless transceiver configured to send and receive wireless communications via a wireless network (e.g., the network 210). The wireless network may be a Wi-Fi network. The user device 202 may communicate with the DNS device 204, the tunnel device 206, and/or the cache device 208 via the communication element 212.

The user device 202 may comprise an address element 214 and a service element 216. The address element 214 may comprise or provide an internet protocol address, a network address, a media access control (MAC) address, an Internet address (e.g., an IPV6 address), or the like. The address element 214 may be used to establish a communication connection between the user device 202, the DNS device 204, the tunnel device 206, the cache device 208, and/or other devices and/or networks. The address element 214 may be an identifier or locator of the user device 202. The address element 214 may be persistent for a particular network (e.g., the network 210).

The service element 216 may comprise an identification of a service provider associated with the user device 202 and/or with the class of user device 202. The class of the user device 202 may be related to a type of device, capability of device, type of service being provided, and/or a level of service (e.g., business class, service tier, service package, etc.). The service element 216 may comprise information relating to or provided by a service provider (e.g., Internet service provider, content service provider, etc.) that provides or enables data flow such as communication services and/or content services to the user device 202. The service element 216 may comprise information relating to a preferred service provider for one or more particular services relating to the user device 202. The address element 214 may be used to identify or retrieve data from the service element 216, or vice versa. One or more of the address element 214 and/or the service element 216 may be stored remotely from the user device 202. Other information may be represented by the service element 216.

The user device 202 may be associated with a user identifier or device identifier 220. The device identifier 220 may be any identifier, token, character, string, or the like, for differentiating one user or computing device (e.g., the user device 202) from another user or computing device. For example, the device identifier 220 may be or relate to an Internet Protocol (IP) Address, a Media Access Control (MAC) address, an International Mobile Equipment Identity (IMEI) number, an International Mobile Subscriber Identity (IMSI) number, a phone number, a SIM card number, and/or the like. The device identifier 220 may identify a user or user device as belonging to a particular class of users or user devices. The device identifier 220 may comprise information relating to the user device 202 such as a manufacturer, a model or type of device, a service provider associated with the user device 202, a state of the user device 202, a locator, and/or a label or classifier. Other information may be represented by the device identifier 220.

The user device 202 may comprise communication software 218. The communication software 218 may be software, firmware, hardware, and/or a combination of software, firmware, and hardware. The communication software 218 may allow the user device 202 to communicate with one or more devices. The user device 202 may send a request for content to another device (e.g., the DNS server 204, the tunnel device 206, and/or the cache 208). The user device 202 may receive content from, and/or via, one or more content sources (e.g., the application server 126, the content source 127, the cache device 130, the network component 131, etc.). The computing device 202 may receive the content via the communication element 210.

The DNS device 204 may comprise a routing module 222, and an identifier 226. The DNS device 204 may be a DNS server (e.g., the DNS sever 128 of FIG. 1). The DNS device 204 may receive DNS requests and process DNS requests. The routing module 222 may route network traffic within the network 210. The routing module 222 may receive a request that indicates a domain name. For example, the user device 202 may send a request to the routing module 222 to determine an address associated with the domain name. The routing module 222 may determine the address associated with the domain name based on a database comprising a plurality of domain names and associated addresses. The routing module 222 may send the address associated with the domain name to the user device 202 to facilitate the user device 202 communicating with another device.

The routing module 222 may determine one or more addresses that satisfy the request. For example, a plurality of devices may be associated with the domain name. Each of the plurality of devices may comprise an address associated with the device. The routing module 222 may determine one device of the plurality of devices that satisfies the request. The routing module 222 may determine the device based on one or more characteristics of the device and/or the request. For example, the device may be located closer to the user device 202 than the other devices. As another example, the one or more characteristics can be operational characteristics that indicate the operational status of the device. As an example, the operational characteristics may include the utilization of the device, the bandwidth of the device, whether the device is down, and so forth. The routing module 222 may determine one device out of the plurality of devices. For example, the routing module 222 may determine the one device based on the one or more characteristics of the device and/or the request. The routing module 222 may determine an address associated with the one device and may provide (e.g., send) the address to the user device 202 to stratify the request.

The DNS device 204 may be associated with a user identifier or device identifier 224. A device may utilize the device identifier 224 to communicate with the DNS device 204. For example, the user device 202 may send a request (e.g., a domain name request) to the DNS device 204 based on the device identifier 224. The device identifier 224 may be any identifier, token, character, string, or the like, for differentiating one user or DNS device from another user or DNS device. For example, the device identifier 224 may be or relate to an Internet Protocol (IP) Address, a Media Access Control (MAC) address, an International Mobile Equipment Identity (IMEI) number, an International Mobile Subscriber Identity (IMSI) number, a phone number, a SIM card number, and/or the like. The device identifier 224 may identify a user or DNS device as belonging to a particular class of users or DNS devices. The device identifier 224 may comprise information relating to the DNS device 204 such as a manufacturer, a model or type of device, a service provider associated with the DNS device 224, a state of the DNS device 224, a locator, and/or a label or classifier. Other information may be represented by the device identifier 224.

The tunnel device 206 may comprise a communication element 226, an address element 228, a cache device database 230, communication software 232, and an identifier 234. The tunnel device 206 may be tunnel server (e.g., the tunnel server 129 of FIG. 1). The communication element 226 may be configured for communicating via any network protocol. For example, the communication element 226 may communicate via wired network protocol (e.g., Ethernet, LAN, etc.) on a wired network (e.g., the network 210). The communication element 226 may comprise a wireless transceiver configured to send and receive wireless communications via a wireless network (e.g., the network 210). The wireless network may be a Wi-Fi network. The tunnel device 206 may communicate with the user device 202 and/or the cache device 208 and/or via the communication element 226.

The tunnel device 206 may comprise an address element 228. The address element 228 may comprise or provide an internet protocol address, a network address, a media access control (MAC) address, an Internet address (e.g., an IPV6 address), or the like. The address element 228 may be used to establish a communication connection between the user device 202 and/or the cache device 208 and the tunnel device 206, and/or other devices and/or networks. The address element 228 may be an identifier or locator of the tunnel device 206. The address element 228 may be persistent for a particular network (e.g., the network 210).

The tunnel device 206 may comprise a cache device database 230. The cache device database 230 may store a plurality of files (e.g., web pages), user identifiers or records, or other information. The cache device database 230 may store information relating to the user device 202 such as the address element 214 and/or the service element 216. The cache device database 230 may store information relating to one or more cache devices 208. The cache device database 230 may store information relating to the content stored on each of the one or more cache devices 208. The cache device database 230 may store information relating to the operational characteristics of each of the one or more cache devices 208. The operational characteristics may be utilization of the cache device 208, bandwidth of the cache device 208, whether the cache device 208 is down, and so forth. Any information may be stored in and retrieved from the cache device database 230. The cache device database 230 may be disposed remotely from the tunnel device 206 and accessed via a direct or an indirect connection. The cache device database 230 may be integrated with the tunnel device 206 or some other device or system. Additionally, the cache device database 230 may utilize consistent hashing to determine the content stored on the one or more cache device 208, as well as the operational characteristics of the one or more cache device 208. Thus, the amount of data stored in the cache device database 230 may be reduced by utilizing consistent hashing.

The tunnel device 206 may be associated with a user identifier or device identifier 234. The device identifier 234 may be any identifier, token, character, string, or the like, for differentiating one user or tunnel device (e.g., the tunnel device 206) from another user or tunnel device. For example, the device identifier 234 may be or relate to an Internet Protocol (IP) Address, a Media Access Control (MAC) address, an International Mobile Equipment Identity (IMEI) number, an International Mobile Subscriber Identity (IMSI) number, a phone number, a SIM card number, and/or the like. The device identifier 234 may identify a user or tunnel device as belonging to a particular class of users or tunnel devices. The device identifier 234 may comprise information relating to the tunnel device 206 such as a manufacturer, a model or type of device, a service provider associated with the tunnel device 206, a state of the tunnel device 206, a locator, and/or a label or classifier. Other information may be represented by the device identifier 234.

The tunnel device 206 may comprise communication software 232. The communication software 232 may be software, firmware, hardware, and/or a combination of software, firmware, and hardware. The communication software 232 may facilitate content delivery from the cache device 208 to the user device 202. For example, the user device 202 may send a request for content to the tunnel device 206. The communication software 232 may utilize the database and/or consistent hashing to determine one or more cache devices 208 that may comprise the requested content. For example, the user device 202 may request a specific quality level of the content, and the communication software 232 may utilize the cache device database 230 to identify the cache devices 208 that comprise the content in the requested quality level. Further, the communication software 232 may utilize the cache device database 230 to determine a cache device 208 that has preferred operational characteristics. As an example, there may be three cache devices 208 that comprise the requested content. The operational characteristics of each of the cache devices 208 may indicate the utilization of each of the cache devices 208. The tunnel device 206 can utilize the operational characteristics to identify one of the three cache devices 208 that may be best to provide the content to the user device 202. For example, the tunnel device 206 may select a cache device 208 that is less utilized (e.g., has higher bandwidth to process the content request), that is located closer in proximity to the user device, and so forth, to provide a better experience for the user device 202 as compared to the other two cache devices 208.

The communication software 232 may establish a communication connection with the user device 202. For example, the user device 202 may attempt to establish a communication connection with the tunnel device 206. The communication software 232 may receive a request for content. The request for content may be received by the tunnel device 206 via the TCP connection with the user device 202. The communication software 232 may determine a cache device 208 that may have access to the requested content. The communication software 232 may send data that indicates the cache device 208 to the user device 202. For example, the tunnel device 206 may send an identifier of the cache device 208 to the user device 202. The identifier of the cache device 208 may be an IP address. The user device 202 may utilize the data that indicates the cache device 208 (e.g., the identifier) to modify the request for content. The user device 202 may modify the request for content to indicate that the request for content is destined for the cache device 208.

The communication software 232 may send a TCP reset communication to the user device. The communication software 232 may reset the communication connection with the user device. After the communication connection is reset, the tunnel device 206 may receive a second request for content. The second request for content may be the same request for content as the original request for content. The second request for content may be a packet. For example, the second request for content may be an IP packet. The communication software 232 may encapsulate the second request for content within a second IP packet. The second request for content may indicate that request for content came from the user device 202. The second request for content may indicate that the user device 202 is the device that is requesting to receive the content. The second request for content may be encapsulated within the second IP packet. The tunnel device 206 may send the second IP packet (e.g., the encapsulated packet) to the cache device 208. By sending the second IP packet (e.g., the encapsulated packet) to the cache device 208, the tunnel device 206 facilitates the user device 202 receiving content from the cache device 208.

The cache device 208 may comprise a content database 238 and an identifier 240. The cache device 208 may be configured to provide content, services, and/or the like to the user device 202. The cache device 208 may be one of a plurality of cache devices distributed across a network (e.g., the network 210). For example, the cache device 208 may be an edge device. The cache device 208 may be located in a region proximate to a location of the user device 202. A request for content from the user device 202 may be directed to the cache device 208 (e.g., due to the location of the cache device 208 and/or network conditions). The cache device 208 may be configured to package content for delivery to the user (e.g., in a specific format requested by a user device), provide the user a manifest file (e.g., or other index file describing portions of the content), provide streaming content (e.g., unicast, multicast), provide a file transfer, and/or the like.

The cache device 208 may cache or otherwise store content (e.g., frequently requested content) to enable faster delivery of content to users. The cache device 208 may cache or otherwise store content within the content database 238. The content database 238 may comprise one or more content items. The cache device 208 may search the content database 238 to determine one or more requested content items. The cache device 208 may provide the one or more requested content items to another device (e.g., the user device 202).

The cache device 208 may receive data (e.g., an IP packet) from the tunnel device 206. The cache device 208 may decapsulate the data. For example, the cache device 208 may process the data to determine the request that was encapsulated within the data. For example, the data may be an IP packet that is encapsulated within a second IP packet. The cache device 208 may process the IP packet to determine the payload of the second IP packet. The cache device 208 may process the request that was encapsulated within the second IP packet. For example, for example, the cache device 130 may determine what the requested content is, and send the requested content to the device requesting the content. For example, the cache device 208 may send the requested content to the user device 202.

The cache device 208 may determine that the request did not originate from the tunnel server 206. For example, the cache device 208 may receive the second IP packet (e.g., the packet that comprises the encapsulated request) from the tunnel server 206, and the cache device 208 may determine that the second IP packet was sent by the tunnel server 206. However, when the cache device 208 processes the second IP packet to determine the payload (e.g., the request for content) of the second IP packet, the cache device 208 may determine that the request for content came from the user device 202 and not the tunnel server 206. Thus, the cache device 208 sends the requested content to the user device 202, and not the tunnel device 206, because the request originated from the user device 202 even though the cache device 208 received the packet that contained the request from the tunnel device 206. Therefore, the tunnel server 206 can facilitate transmitting content to the user device 202 from the cache device 208 without the tunnel server 206 transmitting the content to user device 202. Accordingly, the cache device 208 transmits the content (e.g., directly) to the user device 202 without going through the tunnel server 206. Thus, the processing load on the tunnel server 206 is reduced because the tunnel server 206 does not have to send the content to the user device 202, while at the same time facilitating the user device 202 receiving the content from the cache device 208.

The cache device 208 may be associated with a user identifier or device identifier 238. The device identifier 238 may be any identifier, token, character, string, or the like, for differentiating one user or cache device (e.g., the cache device 208) from another user or cache device. For example, the device identifier 238 may be or relate to an Internet Protocol (IP) Address, a Media Access Control (MAC) address, an International Mobile Equipment Identity (IMEI) number, an International Mobile Subscriber Identity (IMSI) number, a phone number, a SIM card number, and/or the like. The device identifier 238 may identify a user or cache device as belonging to a particular class of users or cache devices. The device identifier 238 may comprise information relating to the cache device 208 such as a manufacturer, a model or type of device, a service provider associated with the cache device 208, a state of the cache device 208, a locator, and/or a label or classifier. Other information may be represented by the device identifier 238.

Figure 3:
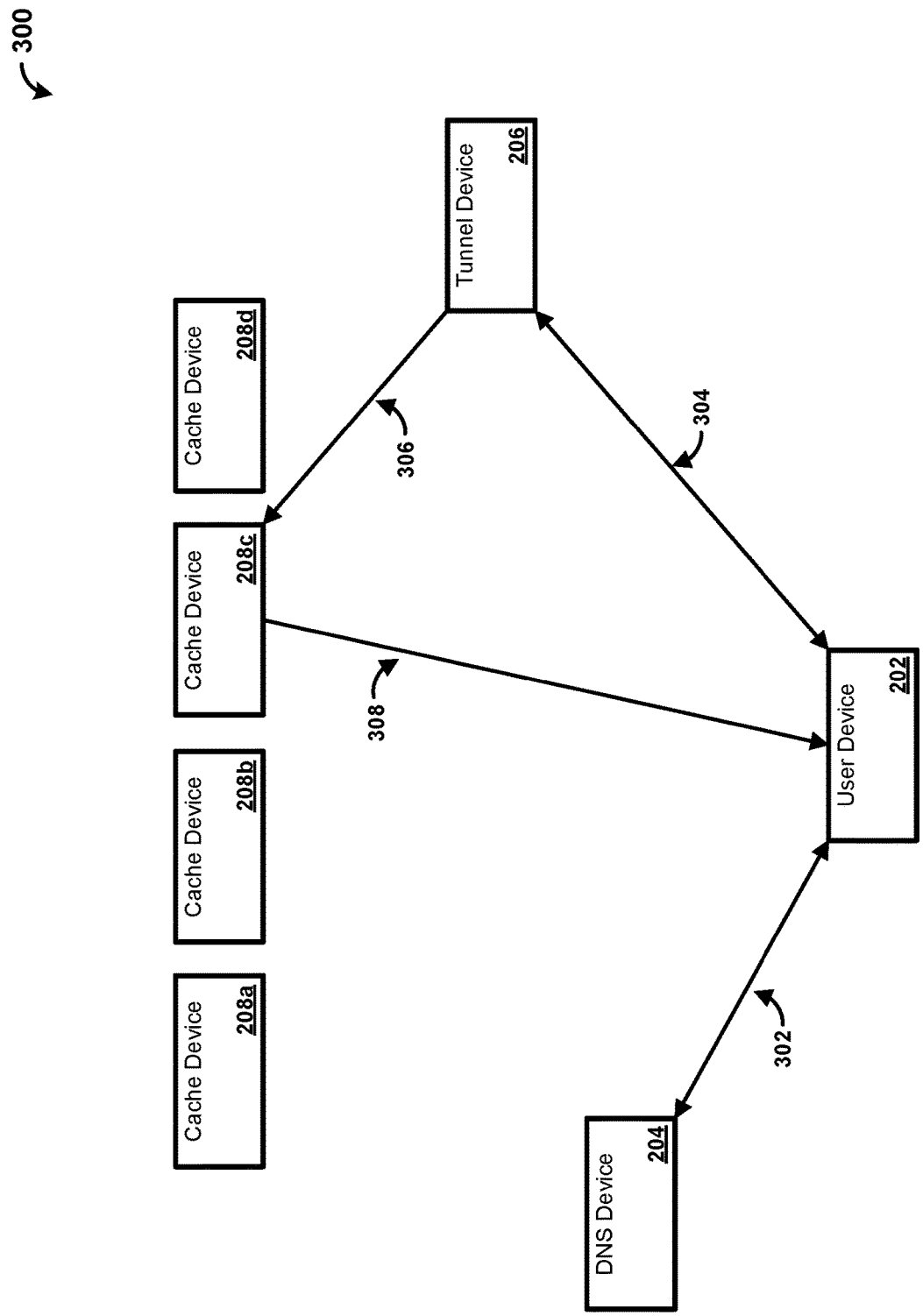
FIG. 3 shows an example system for content distribution.

FIG. 3 shows an example system 300 for content distribution. The system 300 comprises the user device 202, the DNS device 204, the tunnel device 206, and cache devices 208a,b,c,d. The user device 202 may communicate with the DNS device 204 via a communication connection 302. For example, the user device 202 may send a request to the DNS device 204. As an example, the user device 202 may send a request based on a domain name to the DNS device 204 via the communication connection 302. The DNS device 204 may determine an address associated with the domain name, and may send the address associated with the domain name to the user device 202 via the communication connection 202. The user device 202 may receive the address associated with the domain name.

The user device 202 may establish a communication connection 304 with the tunnel device 206. The user device 202 may send a request to the tunnel device 206 via the communication connection 304. The tunnel device 206 may receive the request and determine a cache device 208 associated with the request. The tunnel device 206 may determine an identifier associated with the cache device 208 to the user device 202 via the communication connection 304. For example, the tunnel device 206 may determine, based on the request from the user device 202, that the content that the user device 202 requested is stored on the cache device 208c. The tunnel device 206 may send an address associated with the cache device 208c to the user device 202. The tunnel device 206 may send a TCP reset to the user device 202 to reset the communication connection 304. The user device 202 may send a second request for content to the tunnel device 206 via the communication connection 304. For example, the user device 202 may send the original request for content to indicate that the user device 202 is requesting content from the cache device 208c.

The tunnel device 206 may receive the second request for content via the communication connection 304. The tunnel device 206 may encapsulate the second request for content in a data packet. For example, the second request for content may be a first data packet, and the tunnel device 206 may encapsulate the second request for content within a second data packet. The tunnel device 206 may send the second data packet (e.g., the encapsulated data packet) to the cache device 208c.

The cache device 208c may receive the second data packet (e.g., the encapsulated data packet) from the tunnel device 206 via the communication connection 306. The cache device 208c may process the second data packet. The cache device 208c may process the second data packet to determine the first data packet that is encapsulated within the second data packet. The cache device 208c may determine, based on the first data packet, the request for content. The cache device 208c may determine the requested content, and may provide the requested content to the requesting device. For example, the cache device 208c may process (e.g., decapsulate) the second data packet that was received from the tunnel device 206, and determine the request for content that was sent by the user device 202. The cache device 208c may determine to send the content to the user device 202 based on the request for content. Stated differently, even though the cache device 208c received the second packet from the tunnel device 206, the cache device 208c determines that the user device 202 is the requesting device (e.g., the device that originated the request) because the tunnel device 206 encapsulated the request for content in the second packet. Accordingly, by encapsulating the second data packet, the cache device 208c determines that the device that originated the request (e.g., the user device 202) is the device requesting content instead of determining that the device that sent the second data packet (e.g., the tunnel device 206) is the device requesting the content. Therefore, the user device 202 may communicate with the cache device 208c via the tunnel device 206, while the cache device 208c may communicate with the user device 202 directly without communicating via the tunnel device 206.

The cache device cache device 208c may send the requested content to the user device 202 via the communication connection 308. The user device 202 may receive the content via the communication connection 308. The user device 202 may cause output of the requested content on a display device (e.g., the display device 121 of FIG. 1).

Figure 4:
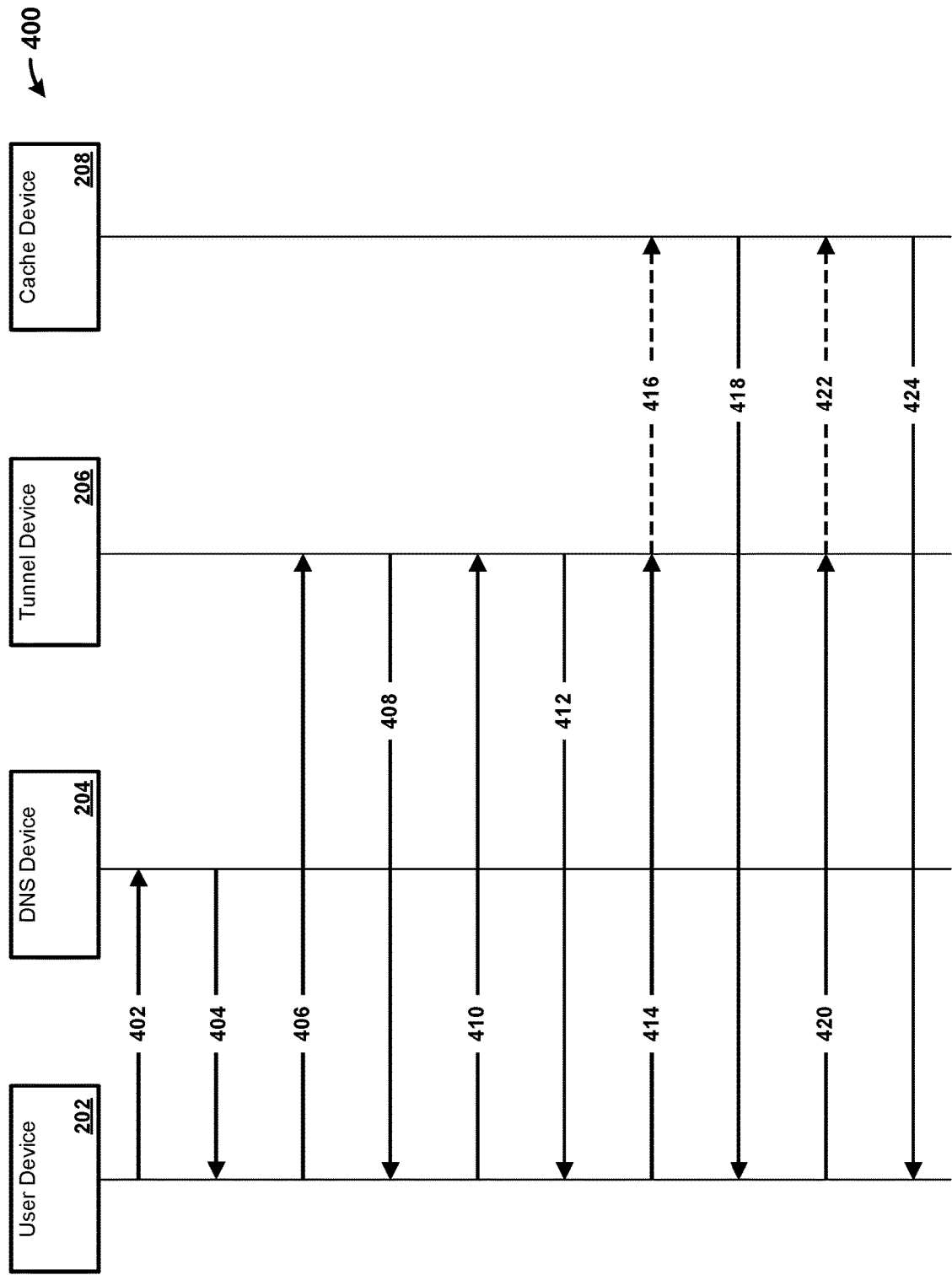
FIG. 4 shows an example sequence for content distribution.

FIG. 4 shows an example sequence 400 for content distribution. The sequence 400 may include the user device 202, the DNS device 204, the tunnel device 206, and the cache device 208. At step 402, the user device 202 sends a request to the DNS device 204. The request may be a requested associated with a domain name. For example, the user device 202 may provide a domain name to the DNS device 204. The DNS device 204 may determine an identifier associated with the domain name. For example, the DNS device 204 may determine an address (e.g., an IP address) associated with the domain name. The address may indicate the tunnel device 206. As an example, the address may be the IP address of the tunnel device 206. At step 404, the DNS device 204 may send the address to the user device 202.

At step 406, the user device 202 may attempt establish a communication connection with the tunnel device 206. For example, the user device 202 may send a request to establish a TCP connection with the tunnel device 206. At step 408, the tunnel device 206 may respond to the attempt to establish the communication connection with the user device 202. For example, the tunnel device 206 may establish a TCP connection with the user device 202.

At step 410, the user device 202 may send a request for content to the tunnel device 206. The tunnel device 206 may determine a cache device (e.g., the cache device 208) that can fulfill the request for content.

At step 412, the tunnel device 206 may send a TCP reset to the user device 202. The user device 202 may reset the TCP connection based on the TCP reset received from the tunnel device 206. For example, the user device 202 may establish a second communication connection with the tunnel device 206. At step 414, the user device 202 may send a second request for content. The second request for content may indicate the content that the user device 202 originally requested. For example, the second request for content may be the same as the original request for content. The tunnel device 206 may receive the second request for content. The tunnel device 206 may encapsulate the second request for content within another packet. For example, the second request for content may be a first IP packet, and the tunnel device 206 may encapsulate the first IP packet within a second IP packet.

At step 416, the tunnel device may send the second IP packet (e.g., the encapsulated packet) to the cache device 208. The dotted line as shown in FIG. 4 indicates that an encapsulated packet was sent from the tunnel device 206 to the cache device 208.

At step 418, the cache device 208 sends a communication to the user device 202. The cache device 208 may send the communication to the user device 202 after decapsulating the packet from the tunnel device. For example, the cache device 208 may send a packet to the user device 202 indicating that the cache device 208 requests the cache device 208 establish a communication connection with the user device 202. The user device 202 may receive the request.

At step 420, the user device 202 may send a response to the request to the tunnel device 206. For example, the user device 202 may initiate a handshake with the cache device 208 to establish a communication connection with the cache device 208. The user device 202 may send the handshake to the tunnel device 206. The tunnel device 206 may receive the response. The tunnel device 206 may encapsulate the response within a packet. For example, the response from the user device 202 may be an IP packet, and the tunnel device 206 may encapsulate the IP packet within another IP packet. Thus, the user device 202 establishes the communication connection with the cache device 208 via the tunnel server 206.

At step 422, the tunnel device 206 sends the second IP packet (e.g., the encapsulated response) to the cache device 208. The cache device 208 may receive the second IP packet, and establish a communication connection with the user device 202. For example, the cache device 208 provides a response to the handshake sent by the user device 202. Thus, the user device 202 may establish a communication connection with the cache device 208 via the tunnel device 206.

At step 424, the cache device 208 may send the requested content to the user device 202. For example, the cache device 208 may send the requested content via the communication connection established with the user device 202. The user device 202 may receive the requested content. The user device 202 may cause output of the requested content.

Figure 5:
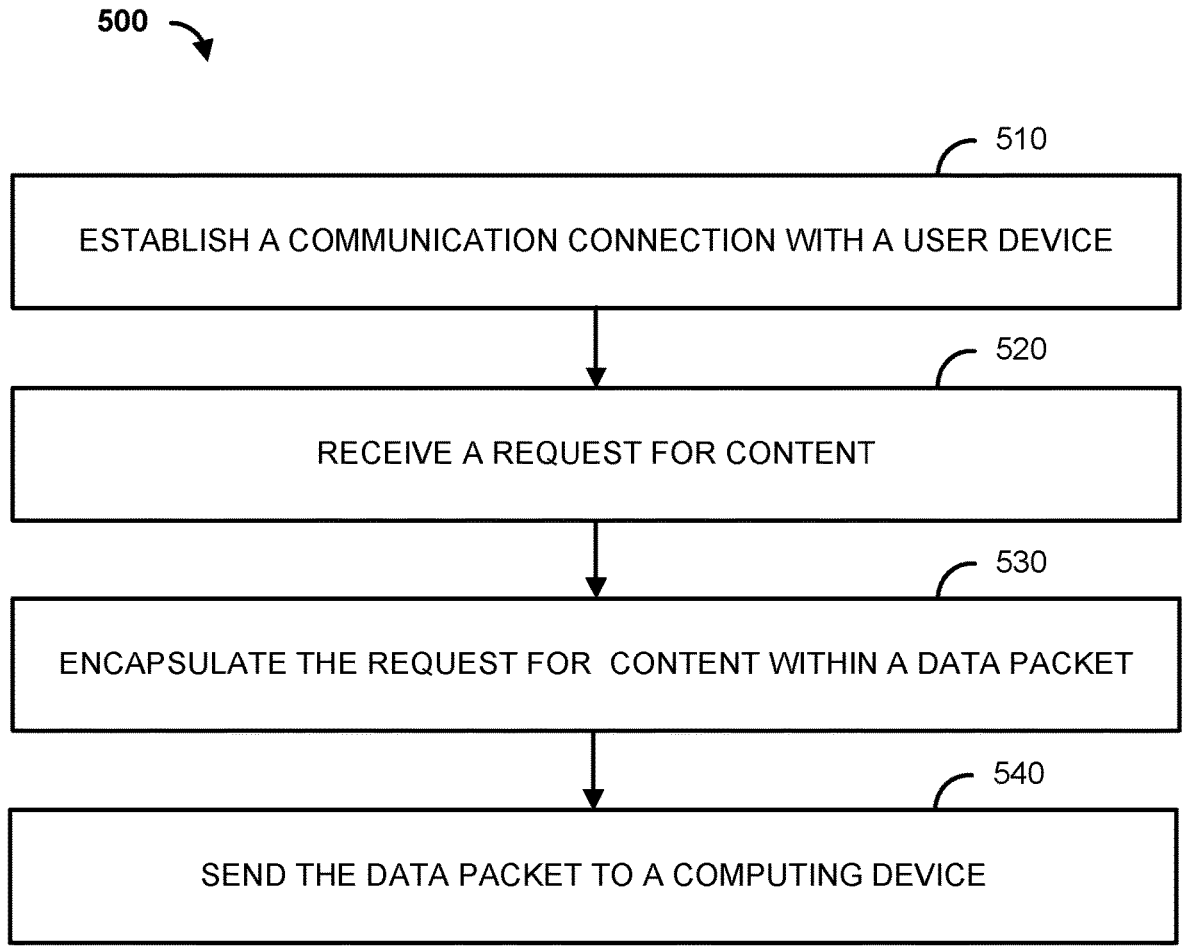
FIG. 5 shows a flowchart of an example method for content distribution.

FIG. 5 shows a flowchart of an example method 500 for content distribution. At step 510, a communication connection with a user device may be established. For example, the communication connection can be established between a user device (e.g., the media device 120, the communications terminal 122, and/or the mobile device 124 of FIG. 1, and/or the user device 202 of FIG. 2) and a first computing device (e.g., the tunnel device 129 of FIG. 1, and/or the tunnel device 206 of FIG. 2). The communication connection may be established based on data provided to the user device from a second computing device (e.g., the DNS server 128 of FIG. 1, and/or the DNS server 204 of FIG. 2). The communication connection may be a TCP connection.

At step 520, a request for content may be received. The request for content may be received by the first computing device. The first computing device may determine a plurality of devices that may provide the content. The first computing device may determine a first device of the plurality of devices that may provide the content. The first computing device may determine an operational parameter for each of the plurality of computing devices. The first computing device may determine a second computing device (e.g., the cache device 130 of FIG. 1, and/or the cache device 208 of FIG. 2) to send the request to. The first computing device may determine the second computing device based on one or more operational parameters associated with the second computing device. The first computing device may determine the second computing devices based on an operational parameter of the second computing device satisfying a threshold. The first computing device may send a TCP reset to the user device. The first computing device may receive a second request for content after sending the TCP reset. The second request for content may be the same request for content as the original request.

At step 530, the request for the content may be encapsulated within a data packet. The request for the content may be encapsulated within the data packet by the first computing device. By encapsulating the request for the content, the device that receives the data packet may determine that the request for the content came from the device that sent the request for content, and not the device that sent the data packet. Stated differently, the device that receives the data packet may determine the data packet came from the user device, and not the first computing device that encapsulated the packet. Thus, encapsulating the request for the content within the data packet prevents the first computing device from receiving the content based on the request.

At step 540, the data packet may be sent to a computing device (e.g., the cache device 130 of FIG. 1, and/or the cache device 208 of FIG. 2). For example, the data packet may be sent by the first computing device to the second computing device. The data packet may facilitate communication between the user device and the second computing device. The second computing device may determine the request for content based on the data packet. For example, the second computing device may decapsulate the data packet to determine the request for the content. The second computing device may determine the content based on the request for the content. The second computing device may send the content to a user device. The second computing device may send the content to the user device without sending the content via the first computing device. For example, the second computing device may send the content directly to the user device even though the request for content came from the first computing device.

Figure 6:
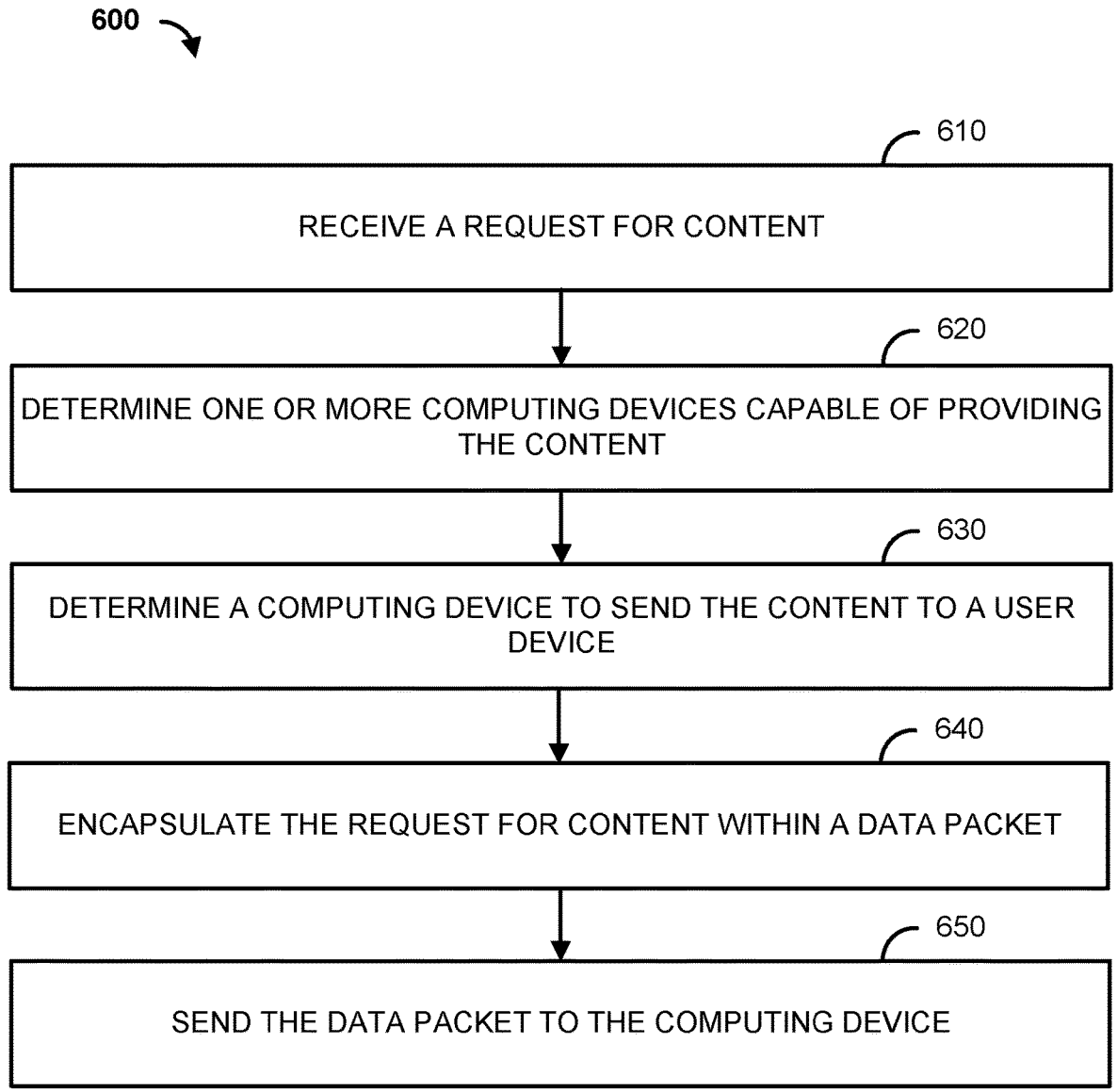
FIG. 6 shows a flowchart of an example method for content distribution.

FIG. 6 shows a flowchart of an example method 600 for content distribution. At step 610, a request for content may be received. The request for content may be received by a first computing device (e.g., the tunnel device 129 of FIG. 1, and/or the tunnel device 206 of FIG. 2). The first computing device may send a TCP reset to the user device. The first computing device may receive the request for content after sending the TCP reset. A communication connection with a user device may be established. For example, the communication connection can be established between a user device (e.g., the media device 120, the communications terminal 122, and/or the mobile device 124 of FIG. 1, and/or the user device 202 of FIG. 2) and a first computing device (e.g., the tunnel device 129 of FIG. 1, and/or the tunnel device 206 of FIG. 2). The communication connection may be established based on data provided to the user device from a second computing device (e.g., the DNS server 128 of FIG. 1, and/or the DNS server 204 of FIG. 2). The communication connection may be a TCP connection.

At step 620, a plurality of computing devices configured for providing the content are determined (e.g., the tunnel device 129 of FIG. 1, and/or the tunnel device 206 of FIG. 2). The first computing device may determine a plurality of devices that may provide the content. At step 630, a computing device (e.g., the cache device 130 of FIG. 1, and/or the cache device 208 of FIG. 2) to send the content to a user device (e.g., the media device 120, the communications terminal 122, and/or the mobile device 124 of FIG. 1, and/or the user device 202 of FIG. 2) may be determined. The first computing device may determine a first device of the plurality of devices that may provide the content. The first computing device may determine an operational parameter for each of the plurality of computing devices. The first computing device may determine a second computing device (e.g., the cache device 130 of FIG. 1, and/or the cache device 208 of FIG. 2) to send the request to. The first computing device may determine the second computing device based on one or more operational parameters associated with the second computing device. The first computing device may determine the second computing device based on an operational parameter of the second computing device satisfying a threshold. The operational parameter may indicate the availability of the second computing device to send the content to the user device.

At step 640, the request for the content may be encapsulated within a data packet. The request for the content may be encapsulated within the data packet by the first computing device. By encapsulating the request for the content, the device that receives the data packet may determine that the request for the content came from the device that sent the request for content, and not the device that sent the data packet. Stated differently, the device that receives the data packet may determine the data packet came from the user device, and not the first computing device that encapsulated the packet. Thus, encapsulating the request for the content within the data packet prevents the first computing device from receiving the content based on the request.

At step 650, the data packet may be sent to the computing device (e.g., the cache device 130 of FIG. 1, and/or the cache device 208 of FIG. 2). For example, the data packet may be sent by the first computing device to the second computing device. The data packet may facilitate communication between the user device and the second computing device. The second computing device may determine the request for content based on the data packet. For example, the second computing device may decapsulate the data packet to determine the request for the content. The second computing device may determine the content based on the request for the content. The second device may send the content to a user device. The second computing device may send the content to the user device without traveling via the first computing device.

Figure 7:
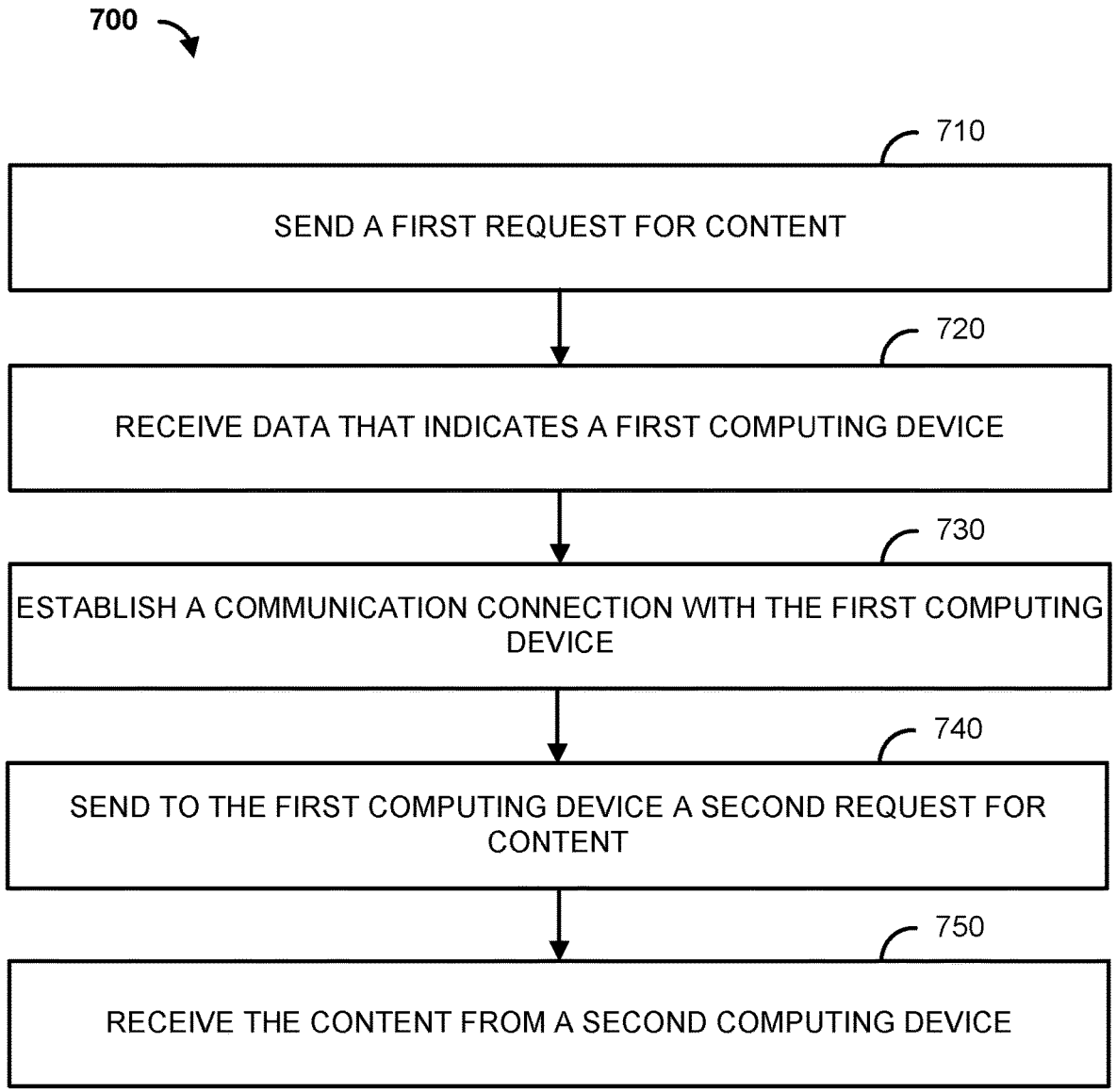
FIG. 7 shows a flowchart of an example method for content distribution.

FIG. 7 shows a flowchart of an example method 700 for content distribution. At step 710, a first request for content may be sent. The first request for content may be sent by a user device (e.g., the media device 120, the communications terminal 122, and/or the mobile device 124 of FIG. 1, and/or the user device 202 of FIG. 2). The first request for content may be sent to a first computing device (e.g., to the DNS server 128 of FIG. 1, and/or to the DNS server 204 of FIG. 2). The first computing device may determine a second computing device based the first request. For example, the first computing device may receive a domain name request, and the first computing device may determine an address associated with the domain name request.

At step 720, data that indicates a computing device may be received. The user device may receive data that indicates a second device. For example, the first computing device may send an address to the user device. The user device may receive the address. The address may be an IP address of the second device.

At step 730, a communication connection with the second computing device may be established. For example, the communication connection can be established between the user device and a tunnel device (e.g., the tunnel device 129 of FIG. 1, and/or the tunnel device 206 of FIG. 2). The communication connection may be established based on data provided to the user device from the first computing device. The communication connection may be a TCP connection.

At step 740, a second request for content may be sent to the second computing device. The request for content may be received by the second computing device. The second computing device may determine a plurality of devices that may provide the content. The second computing device may determine a first device of the plurality of devices that may provide the content. The second computing device may determine an operational parameter for each of the plurality of devices. The second computing device may determine a third computing device (e.g., the cache device 130 of FIG. 1, and/or the cache device 208 of FIG. 2) to send the request to. The second computing device may determine the third computing device based on one or more operational parameters associated with the third computing device. The second computing device may determine the third computing devices based on an operational parameter of the third computing device satisfying a threshold. The second computing device may send a TCP reset to the user device. The second computing device may receive a second request for content after sending the TCP reset. The second request for content may be the same as the original request for content. The request for the content may be encapsulated within a data packet by the second computing device. The request for the content may be encapsulated within the data packet by the second computing device. By encapsulating the request for the content, the device that receives the data packet may determine that the request for the content came from the device that sent the request for content, and not the device that sent the data packet. Stated differently, the device that receives the data packet may determine the data packet came from the user device, and not the second computing device that encapsulated the packet.

At step 750, the content from the third computing device is received. The third device may send the content to the user device. The third computing device may send the content to the user device without sending the content via the first computing device. For example, the third computing device may send the content directly to the user device even though the request for content came from the second computing device.

Figure 8:
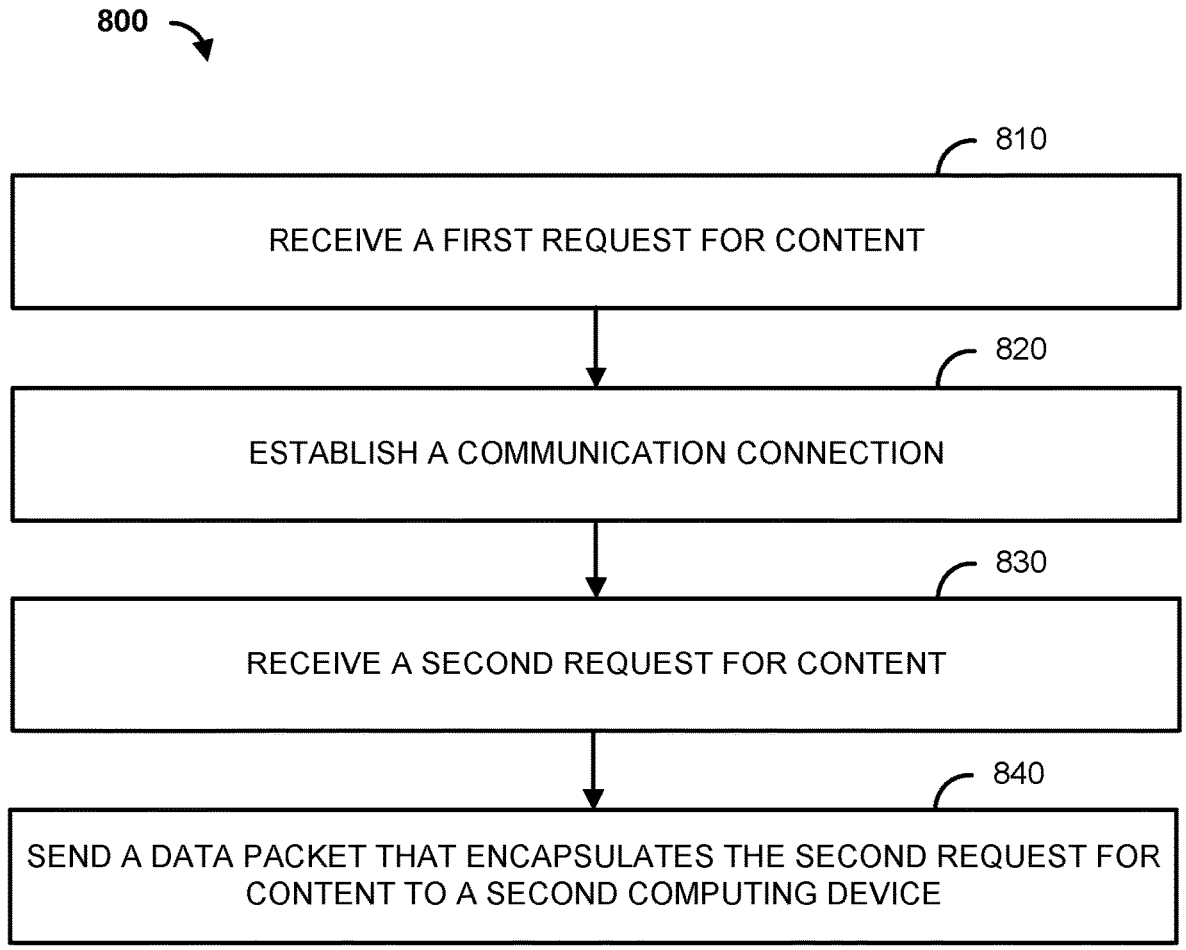
FIG. 8 shows a flowchart of an example method for content distribution.

FIG. 8 shows a flowchart of an example method 800 for content distribution. At step 810, a first request for content may be received. The first request for content may be received by a first computing device (e.g., the tunnel device 129 of FIG. 1, and/or the tunnel device 206 of FIG. 2). The first computing device may comprise a server configured to communicate via Transmission Control Protocol (TCP). The first request for content may be received based on data sent to the user device from a second computing device (e.g., the DNS server 128 of FIG. 1, and/or the DNS server 204 of FIG. 2). For example, the user device may send a request for content to the second computing device, and the second computing device may send the data to the user device. The data may be a DNS communication that indicates the first computing device. For example, the DNS communication may indicate a domain name associated with the first computing device.

At step 820, a communication connection with a user device may be established. For example, the communication connection can be established between a user device (e.g., the media device 120, the communications terminal 122, and/or the mobile device 124 of FIG. 1, and/or the user device 202 of FIG. 2) and a first computing device (e.g., the tunnel device 129 of FIG. 1, and/or the tunnel device 206 of FIG. 2). The communication connection may be established based on data provided to the user device from a second computing device (e.g., the DNS server 128 of FIG. 1, and/or the DNS server 204 of FIG. 2). The communication connection may be a TCP connection. Further, prior to receiving the first request for content, a communication connection may be established between the first computing device and the user device. The first communication connection may be established with the user device after the second communication connection is reset. For example, the second communication connection may be established, and the first computing device may receive a request for content. After receiving the request for content a communication that indicates a TCP reset may be sent to the user device (e.g., by the first computing device). In response to receiving the TCP reset, the user device may reset the TCP connection and send another request for content to the first computing device.

At step 830, a second request for content may be received. The second request for content may be received by the first computing device. The request may be received via the communication connection. The first computing device may determine a plurality of devices that may provide the content. The first computing device may determine a first device of the plurality of devices that may provide the content. The first computing device may determine an operational parameter for each of the plurality of computing devices. The first computing device may determine a second computing device (e.g., the cache device 130 of FIG. 1, and/or the cache device 208 of FIG. 2) to send the request to. The first computing device may determine the second computing device based on one or more operational parameters associated with the second computing device. The first computing device may determine the second computing devices based on an operational parameter of the second computing device satisfying a threshold. The first computing device may send a TCP reset to the user device. The first computing device may receive the second request for content after sending the TCP reset. The second request for content may be the same request for content as the original request.

At step 840, a data packet that encapsulates the second request for content may be sent to a second computing device (e.g., the cache device 130 of FIG. 1, and/or the cache device 208 of FIG. 2). The request for the content may be encapsulated within the data packet by the first computing device. The data packet may facility the second computing device sending the content to the user device. The second request for content may be encapsulated within the data packet. For example, by encapsulating the request for the content, the device that receives the data packet may determine that the request for the content came from the device that sent the request for content, and not the device that sent the data packet. Stated differently, the device that receives the data packet may determine the data packet came from the user device, and not the first computing device that encapsulated the packet. Thus, encapsulating the request for the content within the data packet prevents the first computing device from receiving the content based on the request. Accordingly, the content is sent from the second computing device to the user device without traversing via the first computing device.

The data packet may be sent by the first computing device to the second computing device. The data packet may facilitate communication between the user device and the second computing device. The second computing device may determine the request for content based on the data packet. For example, the second computing device may decapsulate the data packet to determine the request for the content. The second computing device may determine the content based on the request for the content. The second computing device may send the content to a user device. The second computing device may send the content to the user device without sending the content via the first computing device. For example, the second computing device may send the content directly to the user device even though the request for content came from the first computing device.

Figure 9:
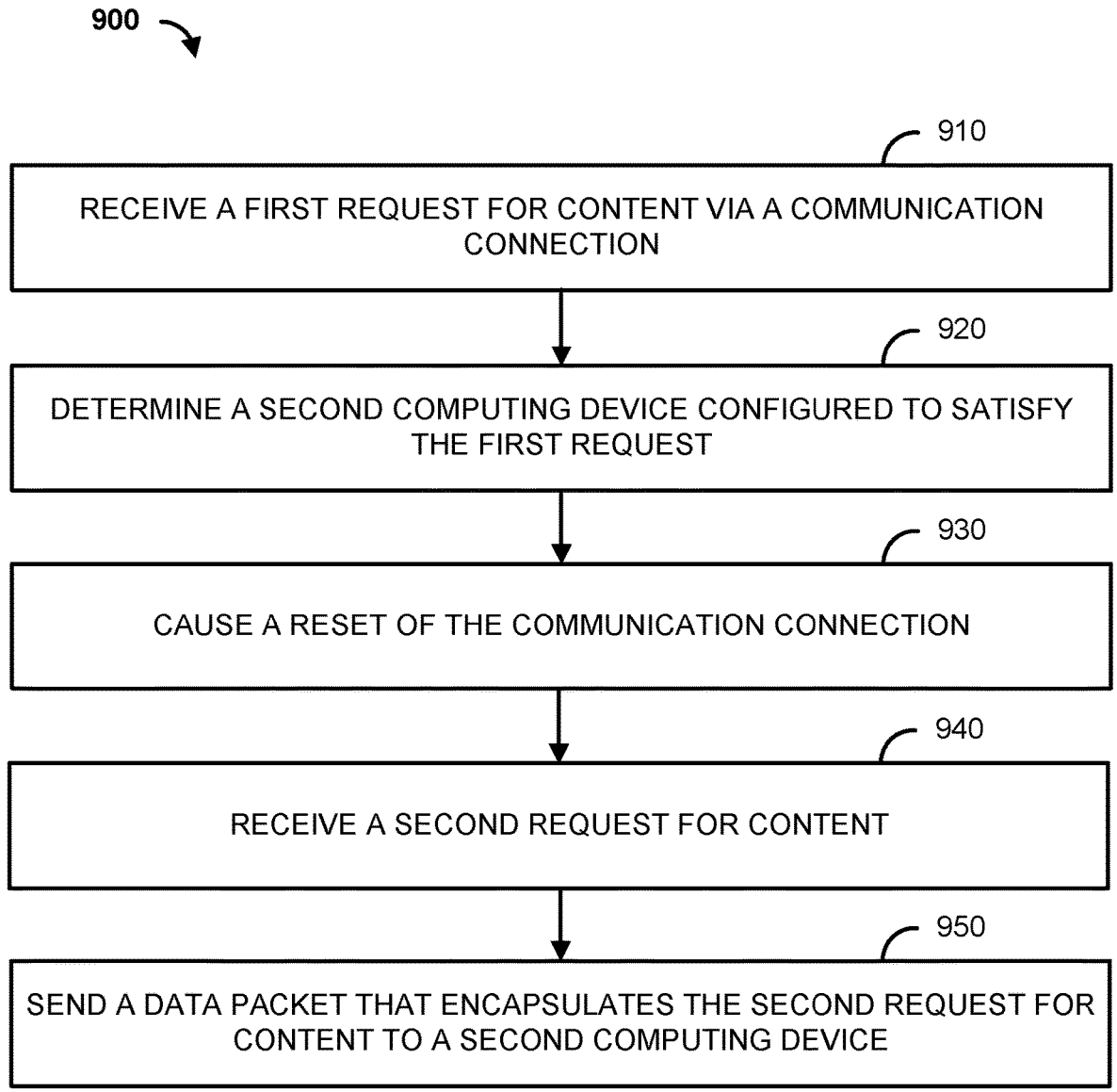
FIG. 9 shows a flowchart of an example method for content distribution.

FIG. 9 shows a flowchart of an example method 900 for content distribution. At step 910, a first request for content is received via a communication connection. The first request for content may be received by a first computing device (e.g., the tunnel device 129 of FIG. 1, and/or the tunnel device 206 of FIG. 2). The first computing device may comprise a server configured to communicate via Transmission Control Protocol (TCP). The first request for content may be received based on data sent to the user device from a second computing device (e.g., the DNS server 128 of FIG. 1, and/or the DNS server 204 of FIG. 2). For example, the user device may send a request for content to the second computing device, and the second computing device may send the data to the user device. The data may be a DNS communication that indicates the first computing device. For example, the DNS communication may indicate a domain name associated with the first computing device.

At step 920, a second computing device configured to satisfy the first request is determined. The second computing device may be configured to satisfy the request because the computing device is configured to send content associated with the first request. For example, a plurality of computing devices may be configured for providing the content by a computing device (e.g., the tunnel device 129 of FIG. 1, and/or the tunnel device 206 of FIG. 2). The first computing device may determine a first device of the plurality of devices that may provide the content. The first computing device may determine an operational parameter for each of the plurality of computing devices. The first computing device may determine a second computing device (e.g., the cache device 130 of FIG. 1, and/or the cache device 208 of FIG. 2) to send the request to. The first computing device may determine the second computing device based on one or more operational parameters associated with the second computing device. The first computing device may determine the second computing device based on an operational parameter of the second computing device satisfying a threshold. The operational parameter may indicate the availability of the second computing device to send the content to the user device.

At step 930, a reset of the communication connection is caused. The first computing device may send a communication that indicates a TCP reset to the user device. Based on the communication that indicates the TCP reset, the communication connection may be reset. A new communication connection may be established. For example, the user device may initiate a handshake with the first computing device to re-establish the communication connection.

At step 940, a second request for content is received. The first computing device may receive a second request for content after sending the TCP reset. The second request for content may be the same as the original request for content. The request for the content may be encapsulated within a data packet by the first computing device. The request for the content may be encapsulated within the data packet by the first computing device. By encapsulating the request for the content, the device that receives the data packet may determine that the request for the content came from the device that sent the request for content, and not the device that sent the data packet. Stated differently, the device that receives the data packet may determine the data packet came from the user device, and not the first computing device that encapsulated the packet.

At step 950, a data packet that encapsulates the second request for content may be sent to a second computing device (e.g., the cache device 130 of FIG. 1, and/or the cache device 208 of FIG. 2). The request for the content may be encapsulated within the data packet by the first computing device. The data packet may facilitate the second computing device sending the content to the user device. The second request for content may be encapsulated within the data packet. For example, by encapsulating the request for the content, the device that receives the data packet may determine that the request for the content came from the device that sent the request for content, and not the device that sent the data packet. Stated differently, the device that receives the data packet may determine the data packet came from the user device, and not the first computing device that encapsulated the packet. Thus, encapsulating the request for the content within the data packet prevents the first computing device from receiving the content based on the request. Accordingly, the content is sent from the second computing device to the user device without traversing via the first computing device.

The data packet may be sent by the first computing device to the second computing device. The data packet may facilitate communication between the user device and the second computing device. The second computing device may determine the request for content based on the data packet. For example, the second computing device may decapsulate the data packet to determine the request for the content. The second computing device may determine the content based on the request for the content. The second computing device may send the content to a user device. The second computing device may send the content to the user device without sending the content via the first computing device. For example, the second computing device may send the content directly to the user device even though the request for content came from the first computing device.

Figure 10:
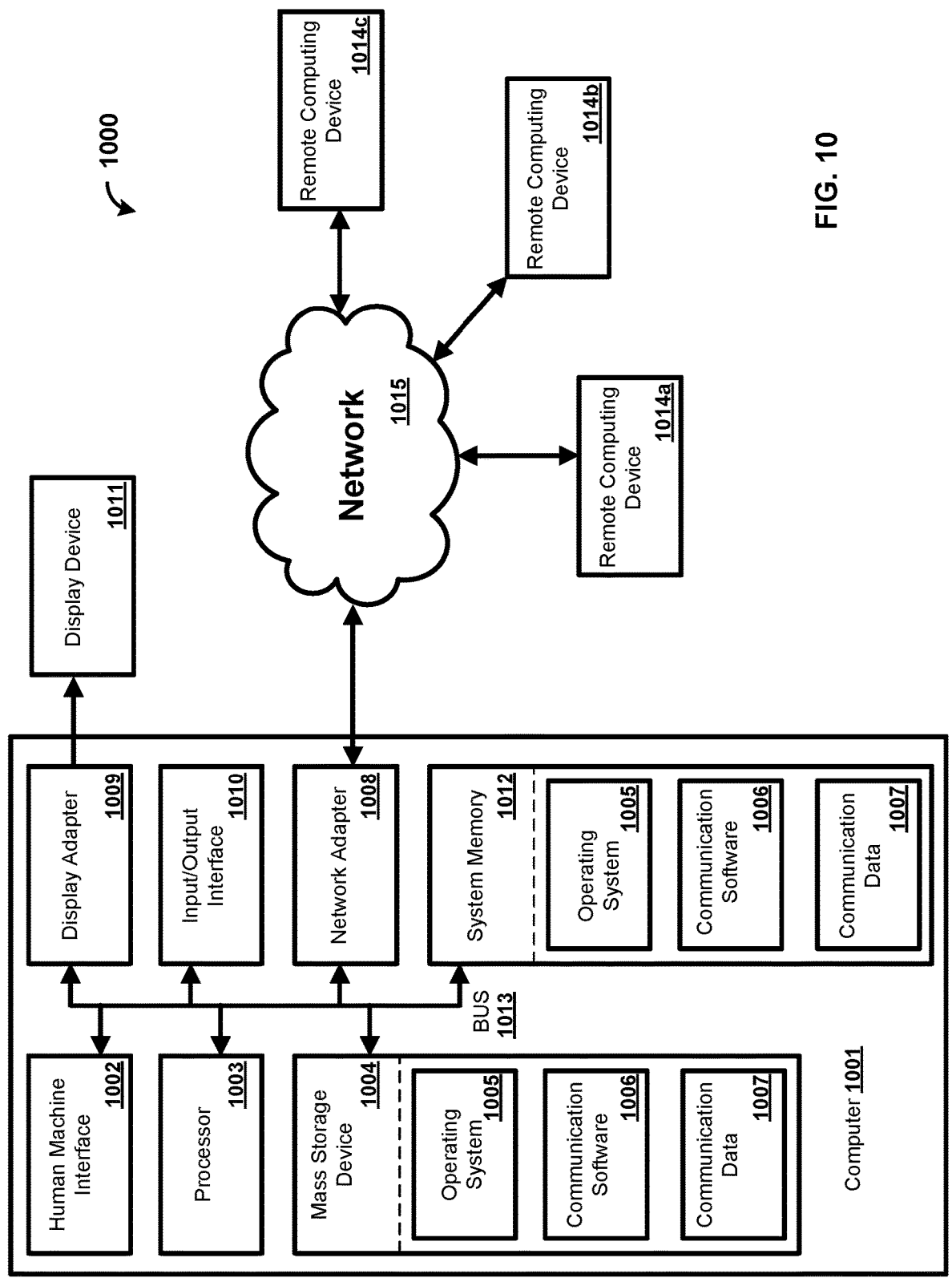
FIG. 10 shows a block diagram of a computing device.

FIG. 10 shows a block diagram 1000 of a computing device 1001. The server 110, the application server 126, the content source 127, the DNS server 128, the tunnel server 129, and/or the cache device 130 of FIG. 1 may be a computer as shown in FIG. 10. The media device 120, the communication terminal 122, and/or the mobile device 124 of FIG. 1 may be a computer as shown in FIG. 10. The user device 202, the DNS device 204, the tunnel device 206, and/or the cache device 208 may be a computer as shown in FIG. 10.

The computer 1001 may comprise one or more processors 1003, a system memory 1012, and a bus 1013 that couples various system components including the one or more processors 1003 to the system memory 1012. In the case of multiple processors 1003, the computer 1001 may utilize parallel computing.

The bus 1013 is one or more of several possible types of bus structures, including a memory bus or memory controller, a peripheral bus, an accelerated graphics port, or local bus using any of a variety of bus architectures.

The computer 1001 may operate on and/or comprise a variety of computer readable media (e.g., non-transitory). The readable media may be any available media that is accessible by the computer 1001 and may include both volatile and non-volatile media, removable and non-removable media. The system memory 1012 may comprise computer readable media in the form of volatile memory, such as random access memory (RAM), and/or non-volatile memory, such as read only memory (ROM). The system memory 1012 may store data such as the communication data 1007 and/or program modules such as the operating system 1005 and the communication software 1006 that are accessible to and/or are operated on by the one or more processors 1003.

The computer 1001 may also comprise other removable/non-removable, volatile/non-volatile computer storage media. FIG. 10 shows the mass storage device 1004 which may provide non-volatile storage of computer code, computer readable instructions, data structures, program modules, and other data for the computer 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004, such as the operating system 1005 and the communication software 1006. Each of the operating system 1005 and the communication software 1006 (or some combination thereof) may comprise elements of the program modules and the communication software 1006. The communication data 1007 may also be stored on the mass storage device 1004. The communication data 1007 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 1015.

A user may enter commands and information into the computer 1001 via an input device (not shown). The input device may be, but not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1003 via a human machine interface 1002 that may be coupled to the bus 1013, but may be connected by other interface and bus structures, such as a parallel port, game port, an IEEE 1394 Port (also known as a Firewire port), a serial port, network adapter 1008, and/or a universal serial bus (USB).

The display device 1011 may also be connected to the bus 1013 via an interface, such as the display adapter 1009. It is contemplated that the computer 1001 may comprise more than one display adapter 1009 and the computer 1001 may comprise more than one display device 1011. The display device 1011 may be a monitor, an LCD (Liquid Crystal Display), light emitting diode (LED) display, television, smart lens, smart glass, and/or a projector. In addition to the display device 1011, other output peripheral devices may be components such as speakers (not shown) and a printer (not shown) which may be connected to the computer 1001 via the Input/Output Interface 1010. Any step and/or result of the methods may be output (or caused to be output) in any form to an output device. Such output may be any form of visual representation, including, but not limited to, textual, graphical, animation, audio, tactile, and the like. The display device 1011 and computer 1001 may be part of one device, or separate devices.

The computer 1001 may operate in a networked environment using logical connections to one or more remote computing devices 1014*a,b,c*. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, an edge device, a content device, a cache device, and so on. Logical connections between the computer 1001 and a remote computing device 1014*a,b,c* may be made via a network 1015, such as a local area network (LAN) and/or a general wide area network (WAN). Such network connections may be through the network adapter 1008. The network adapter 1008 may be implemented in both wired and wireless environments. Such networking environments are conventional and commonplace in dwellings, offices, enterprise-wide computer networks, intranets, and the Internet.

Application programs and other executable program components such as the operating system 1005 are shown herein as discrete blocks, although it is recognized that such programs and components reside at various times in different storage components of the computing device 1001, and are executed by the one or more processors 1003 of the computer. An implementation of the communication software 1006 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, by a first computing device from a user device via a first communication connection, a first request for content, wherein the first request for the content is based on a Domain Name System (DNS) communication that indicates the first computing device;
   receiving, by the first computing device via a second communication connection, a second request for the content; and
   based on the second request for the content, sending, to a second computing device, a data packet that encapsulates the second request for the content and that facilitates the second computing device sending the content to the user device.

2. The method of claim 1, further comprising encapsulating the second request for the content within the data packet, and wherein the content is sent, from the second computing device to the user device, without traversing the first computing device.

3. The method of claim 1, wherein the data packet that encapsulates the second request for the content is configured to prevent the first computing device from receiving the content from the second computing device.

4. The method of claim 1, wherein the data packet that encapsulates the second request for the content causes the second computing device to determine that the second request for the content was received from the user device.

5. The method of claim 1, further comprising, prior to receiving the first request for the content, establishing, based on the DNS communication that indicates the first computing device, the first communication connection with the user device, wherein the second communication connection is established with the user device after the first communication connection is reset.

6. The method of claim 1, further comprising:
sending, by the user device to a third computing device, the first request for the content, wherein the third computing device comprises a DNS server; and
receiving, by the user device, the DNS communication that indicates the first computing device.

7. The method of claim 1, wherein the first computing device comprises a server configured to communicate via Transmission Control Protocol (TCP), and wherein the second computing device is configured to send the content.

8. The method of claim 1, wherein the first communication connection with the user device comprises a TCP connection, the method further comprising:
after receiving the first request for the content, sending, to the user device, a communication that causes a TCP reset; and
wherein receiving, by the first computing device, the second request for the content comprises receiving, based on the communication, the second request for the content.

9. A method comprising:
receiving, by a first computing device and from a user device, via a communication connection, a first request for content, wherein the first request for the content is based on a Domain Name System (DNS) communication that indicates the first computing device;
determining, based on the first request for the content, a second computing device configured to satisfy the first request;
causing, by the first computing device, a reset of the communication connection with the user device;
receiving, by the first computing device and via a second communication connection after the reset, a second request for the content; and
based on the second request for the content, sending, to the second computing device, a data packet that encapsulates the second request for the content and that facilities the second computing device sending the content to the user device.

10. The method of claim 9, further comprising encapsulating the second request for the content within the data packet, and wherein the content is sent, from the second computing device to the user device, without traversing the first computing device.

11. The method of claim 9, wherein the data packet that encapsulates the second request for the content is configured to prevent the first computing device from receiving the content from the second computing device.

12. The method of claim 9, wherein the data packet that encapsulates the second request for the content causes the second computing device to determine that the second request for the content was received from the user device.

13. The method of claim 9, further comprising, prior to receiving the first request for the content, establishing, based on the DNS communication that indicates the first computing device, the communication connection with the user device, wherein the second communication connection is established with the user device after the communication connection is reset.

14. The method of claim 9, further comprising:
sending, by the user device to a third computing device, the first request for the content, wherein the third computing device comprises a DNS server; and
receiving, by the user device, the DNS communication that indicates the first computing device.

15. The method of claim 9, wherein the first computing device comprises a server configured to communicate via Transmission Control Protocol (TCP), and wherein the second computing device is configured to send the content.

16. The method of claim 9, wherein the communication connection with the user device comprises a TCP connection, the method further comprising:
after receiving the first request for the content, sending, to the user device, a communication that causes a TCP reset; and
wherein receiving, by the first computing device, the second request for the content comprises receiving, based on the communication, the second request for the content.

17. A system comprising:
a user device configured to,
send, based on a Domain Name System (DNS) communication that indicates a first computing device, a first request for content;
the first computing device configured to,
receive the first request for the content, and
based on the first request for the content, send, to a second computing device, a data packet that encapsulates the first request for the content; and
the second computing device configured to,
send, to the user device based on the data packet and based on the first request for the content, the content, wherein the content is sent from the second computing device to the user device without traversing the first computing device.

18. The system of claim 17, wherein the first computing device is further configured to encapsulate the first request for the content within the data packet.

19. The system of claim 17, wherein the data packet that encapsulates the first request for the content is configured to prevent the first computing device from receiving the content from the second computing device.

20. The system of claim 17, further comprising a third computing device, wherein the third computing device comprises a DNS server, configured to:
receive, from the user device, a second request for the content; and
send, to the user device and based on the second request for the content, the DNS communication that indicates the first computing device.

* * * * *